(12) United States Patent
Aydinlik et al.

(10) Patent No.: US 10,567,209 B1
(45) Date of Patent: Feb. 18, 2020

(54) GEOMETRICALLY SHAPING QAM MODULATION

(71) Applicant: Acacia Communications, Inc., Maynard, MA (US)

(72) Inventors: Mehmet Aydinlik, Acton, MA (US); Timo Pfau, Somerville, MA (US); Christian Rasmussen, Kongens Lyngby (DK)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 16/224,174

(22) Filed: Dec. 18, 2018

Related U.S. Application Data

(60) Provisional application No. 62/642,557, filed on Mar. 13, 2018.

(51) Int. Cl.
*H04L 27/34* (2006.01)
*H04L 27/36* (2006.01)

(52) U.S. Cl.
CPC ...... *H04L 27/3433* (2013.01); *H04L 27/3455* (2013.01); *H04L 27/3483* (2013.01); *H04L 27/364* (2013.01)

(58) Field of Classification Search
CPC ............. H04L 27/3433; H04L 27/3455; H04L 27/3483; H04L 27/364; H04L 27/3405
See application file for complete search history.

(56) References Cited

U.S. PATENT DOCUMENTS

| 2002/0031190 | A1* | 3/2002 | Ophir | H04L 1/0042 |
| | | | | 375/265 |
| 2010/0239038 | A1* | 9/2010 | Seyedi-Esfahani | ......................... |
| | | | | H04L 27/2082 |
| | | | | 375/261 |
| 2019/0109752 | A1* | 4/2019 | Zhang | H04L 27/345 |

OTHER PUBLICATIONS

Hou, Hsin-An. "Modified 128-QAM Constellation Schemes Allowing Low-Complexity Non-Data-Aided Carrier Recovery." Sep. 2005. IEEE, 16th International Symposium on Personal, Indoor and Mobile Radio Communications. (Year: 2005).*

* cited by examiner

*Primary Examiner* — David S Huang
(74) *Attorney, Agent, or Firm* — Joseph D'Angelo

(57) ABSTRACT

A method, system, and apparatus for encoding a data for transmission across a communication link, the comprising encoding the data into a constellation; wherein the constellation is of a power $2^n$; wherein n is an odd number; wherein encoding the constellation creates outer constellation points forming a square at an edge of the constellation.

20 Claims, 11 Drawing Sheets

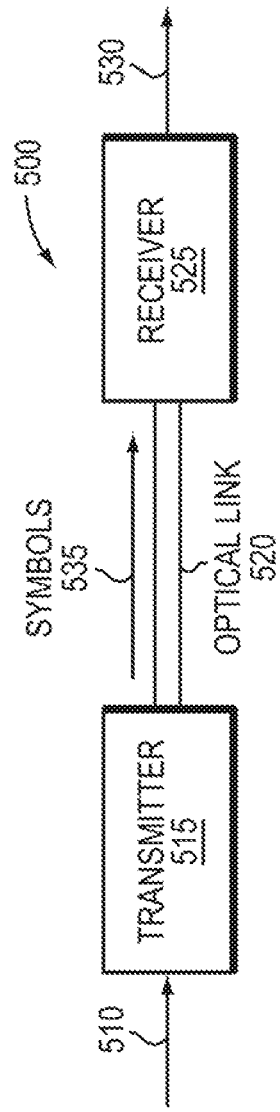
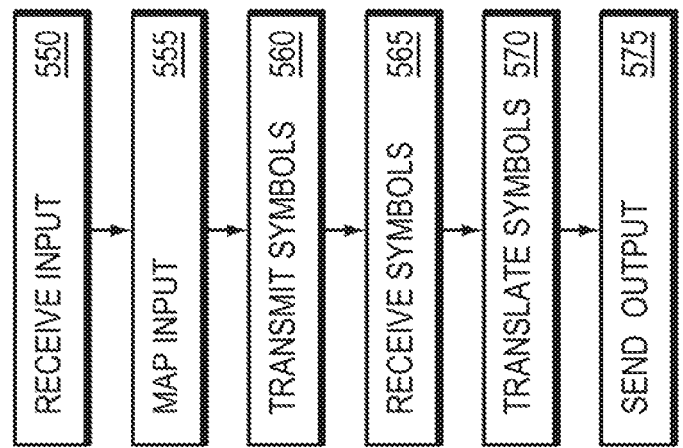
FIG. 5A
FIG. 5B

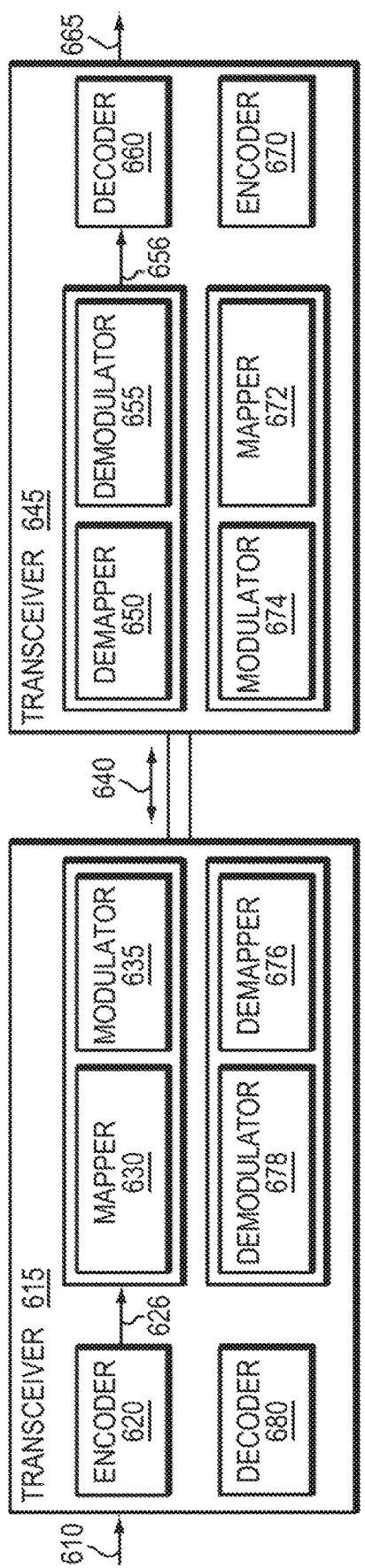
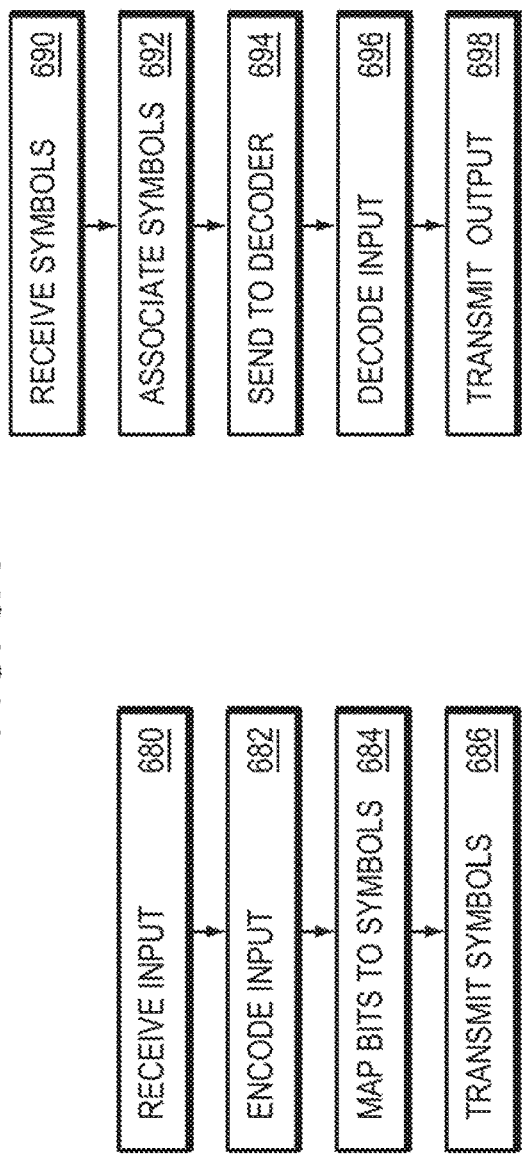
FIG. 6A
FIG. 6B
FIG. 6C

EXAMPLE EMBODIMENT OF A PERFORMANCE COMPARISON OF CONVENTIONAL 32-QAM WITH GEOMETRICALLY SHAPED 32-QAM FOR AN AWGN CHANNEL (ZOOMED TO BER = 2e-2)

US 10,567,209 B1

GEOMETRICALLY SHAPING QAM MODULATION

RELATED APPLICATIONS

The present application claims the benefit under 35 U.S.C. § 119(e) of U.S. Patent Application Ser. No. 62/642,557, filed Mar. 13, 2018 and entitled "GEOMETRICALLY SHAPED 32-QAM," which is hereby incorporated herein by reference in its entirety.

BACKGROUND

Optical transmission of information over a fiber optic cable often encodes the information on a light wave.

BRIEF DESCRIPTION OF THE FIGURES

Various aspects and embodiments of the application will be described with reference to the following example embodiments. It should be appreciated that the figures are not necessarily drawn to scale.

FIG. 5a is a simplified illustration of an optical system with a transmitter and receiver, in accordance with an embodiment of the present disclosure;

FIG. 5b is a simplified method for transmitting data in an optical system, in accordance with an embodiment of the present disclosure;

FIG. 6a is a simplified illustration of an optical system with a two transceivers, in accordance with an embodiment of the present disclosure;

FIG. 6b is a simplified method for sending data in an optical system, in accordance with an embodiment of the present disclosure;

FIG. 6c is a simplified method for receiving data an optical system, in accordance with an embodiment of the present disclosure;

SUMMARY

Figure 1:
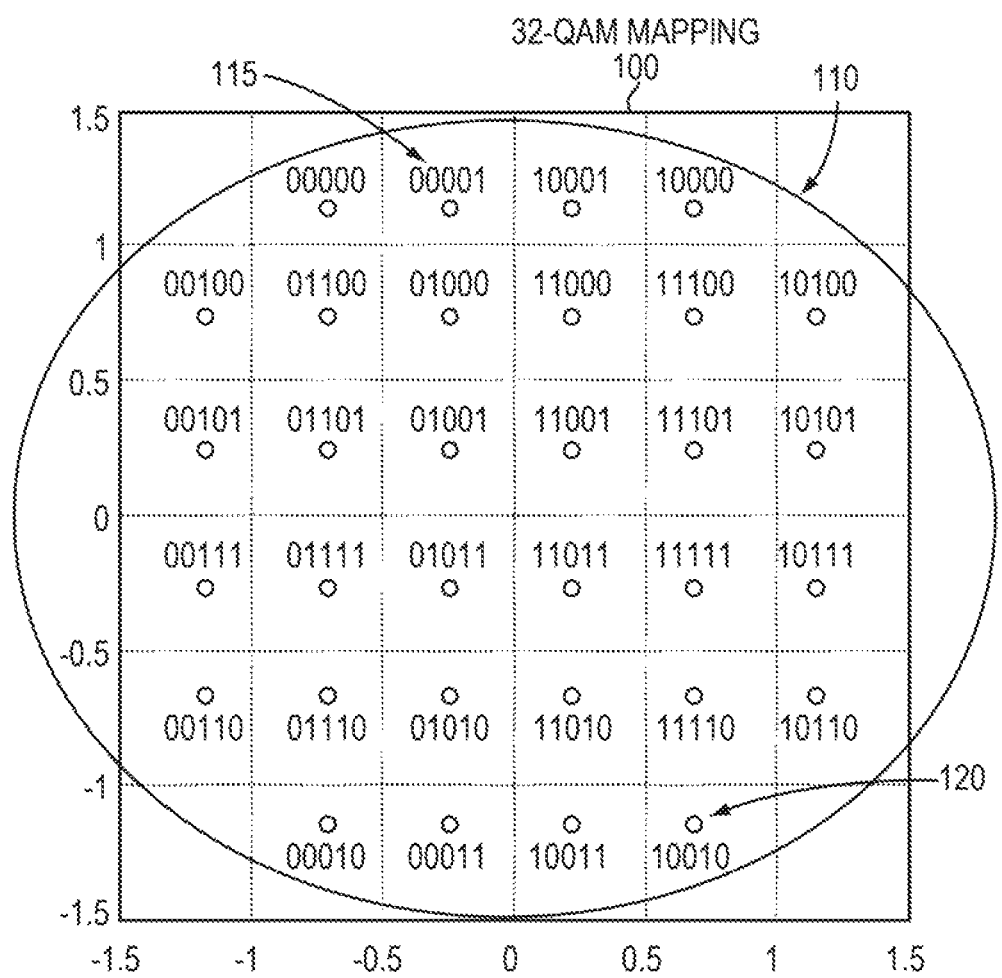
FIG. 1 is a simplified illustration of a 32-QAM modulation format, in accordance with an embodiment of the present disclosure.

A method, system, and apparatus for encoding a data for transmission across a communication link, the comprising encoding the data into a constellation; wherein the constellation is of a power $2^n$; wherein n is an odd number; wherein encoding the constellation creates outer constellation points forming a square at an edge of the constellation.

DETAILED DESCRIPTION

In many embodiments, a communication or transmission system may include a transmitter and a receiver. In most embodiments, a transmission, such as a set of bits, may be encoded in a signal at a transmitter. In most embodiments, a transmitter may transmit an encoded signal to a receiver. In certain embodiments, a receiver may receive a signal from a transmitter and decode the signal into information. In almost all embodiments, there may be a number of conditions that may impact the signal which may make it hard to decode the information. In certain embodiments, a signal may be transmitted over an RF connection. In other embodiments, a signal may be transmitted over an optical link.

Often, a transmitter may use a modulation scheme to transmit data using a signal. Conventional modulation schemes associate data bits with symbols. Quadrature amplitude modulation (QAM) is one example type of a typical type of modulation scheme and is commonly used in many communication systems including fiber optical and digital radio communications. Generally, the number of different symbols in a modulation format determines the order of a digital communication scheme. Conventionally, higher order modulation formats enable carrying more bits of information or parity bits per symbol. Usually, by selecting a higher order format of QAM, the data rate of a link can be increased.

In certain embodiments, QAM modulation may be used in an optical communication system. In some embodiments, an optical transmitter may be used. In many embodiments, the optical transmitter may include a modulator enabled to associate data bits with symbols and transmit the symbols over an optical channel. In some embodiments, a modulator may encode an optical signal in a QAM format. In some embodiments, an optical system may include an optical receiver. In many embodiments and optical receiver may include a demodulator enabled to associate symbols received over an optical channel with bits.

Conventionally, a QAM scheme may be associated with a constellation diagram having M points arranged in a two-dimensional plane. Usually, the M points represent the M possible symbols to which data bits may be mapped, where M is an integer. For example, an 8 QAM scheme may be associated with a constellation diagram having 8 points arranged in a two-dimensional plane representing 8 possible symbols to which data bits may be mapped. As another example, in conventional 16QAM, data bits are mapped to 16 different symbols. Generally, each particular one of the M points may be associated with a label indicating the bit sequence mapped to the symbol represented by the particular one point. For example, a particular one of the 8 points in a constellation diagram for 8 QAM may be associated with a label (e.g., "010") indicating that data bits "010" are mapped to the symbol represented by the particular one point. Conventional examples of QAM schemes include 8QAM, 16QAM, 32QAM, 64QAM, and 256QAM schemes.

In some embodiments, the current disclosure has realized that QAM formats that are an even power of two, such as two squared or two to the fourth, may result in a geometrically shaped QAM constellation with points at the corners of the constellation. In other embodiments, the current disclosure has realized that QAM formats that are an odd power of two, such as two cubed or two to the fifth, may result in QAM formats that are not geometrically shaped to have points at the corners of the constellation and may instead appear to be rounded. In most embodiments, techniques of the current disclosure may be used with any modulation format that is an odd power of 2 such as 2^5 or 2^7 or does not have points at corners of a constellation.

Conventional constellation mappings usually arrange the points on a rectangular grid, which typically yield constellations that do not have corners for constellations of 2 to an odd power. In some embodiments, arranging constellation points in this manner is standard and may has some advantages for modulating and demodulation the signal. In certain embodiments, arranging constellation points on a rectangular grid may have advantages for the systems that support more than one modulation formats. In certain embodiments, 16QAM modulation constellation points may be a subset of 32QAM modulation. In many embodiments, this may allow a system to use common parts for two different modulation formats. In certain embodiments, some parts that are used for 16QAM can also be utilized for 32-QAM. Generally, this mapping has been found to have good performance metrics over an AWGN channel. In most, embodiments, an AWGN channel may be a channel with additive white Gaussian noise (AWGN).

In some embodiments, the current disclosure has realized that there are drawbacks when other types of noise (e.g. phase noise) and/or distortions (e.g. polarization crosstalk) occur during the transmission of constellations that do not have constellation points on the corners. In many embodiments, the current disclosure may create a modified constellation of odd powers of two that creates a constellation that is geometrically shaped to have constellation points at the corners of the constellation. In many embodiments, a modulator may encode a signal in an optical format that has constellation points at corners of the constellation. In some embodiments, a demodulator may operate on a QAM signal shaped to have constellation points at the corners of the constellation. In many embodiments, an outer constellation point may be a constellation point that has the or highest or lowest value in a respective X or Y direction. In certain embodiments, an inner constellation point may be a constellation point where there is an outlying constellation point in the X or y direction.

In certain embodiments, a receiver in a communication system may be designed to combat impairments introduced due to imperfections in the communication system. In some embodiments, impairments may include amplified spontaneous emission (ASE) noise, phase noise, and polarization mode dispersion. In many embodiments, there may be a tradeoff between power consumption and performance of a receiver when various impairments are present in a system. In many embodiments, the higher encoding of a QAM signal, the more susceptible the signal may be to impairments. In many embodiments, a constellation may be modified using one or more of the techniques of the current disclosure to make the constellation more suitable for lower power receiver algorithms. In certain embodiments, modifying a constellation may enable a communication system to better handle impairments.

In many embodiments, the current disclosure has realized that an impairment in coherent systems may be phase noise induced by a signal laser and a free running local oscillator (LO) laser. In some embodiments, phase noise may be compensated using digital carrier phase recovery (CPR) algorithms. In alternative embodiments, several CPR algorithms may be used in a square QAM signal with both decision-directed feedback and blind feed-forward structures. In many embodiments, the current disclosure may enable encoding of a QAM signal in a square or rectangular constellation format, where the constellation would otherwise not have points at its corners.

In other embodiments, it may be desired to implement a digital CPR in a blind feed-forward manner for hardware efficiency and better phase noise tolerance. In some embodiments, a Viterbi & Viterbi (V-V) algorithm may be used for CPR of phase shift keying (PSK) signals with uniform phase distribution. In most embodiments, the current disclosure has realized that adapting a V-V algorithm for CPE of higher order signals may be complex due to intrinsic characteristics of square constellations i.e. non-uniform phase distribution. In some embodiments, to address one or more problems resulting from impairments, techniques such as QPSK partitioning and blind phase search may be used. In other embodiments, the current disclosure has realized that a V-V algorithm may work better on a constellation that has been modified to have points in the corner than a constellation that traditionally would not have had point in the corner.

Refer now to the example embodiment of FIG. 1, which illustrates a sample 32-QAM modulation format. In the example embodiment of FIG. 1, within circle 110 are a set of points that represent 32 QAM constellation 100. Each point within circle 110, such as point 115 or 120 represents, an in-phase and quadrature value (I and Q value) for this constellation. For example, the I and Q value for point 120 is approximately 0.75 by 1.1. For each point for this constellation within circle 110, 5 bits of information or parity bits have been assigned. In this example embodiment, the respective 5 bits carried by each constellation point is shown next to the respective constellation point. For example, the bits for point 115 are 00001 and for point 120 are 10010.

Figure 2:
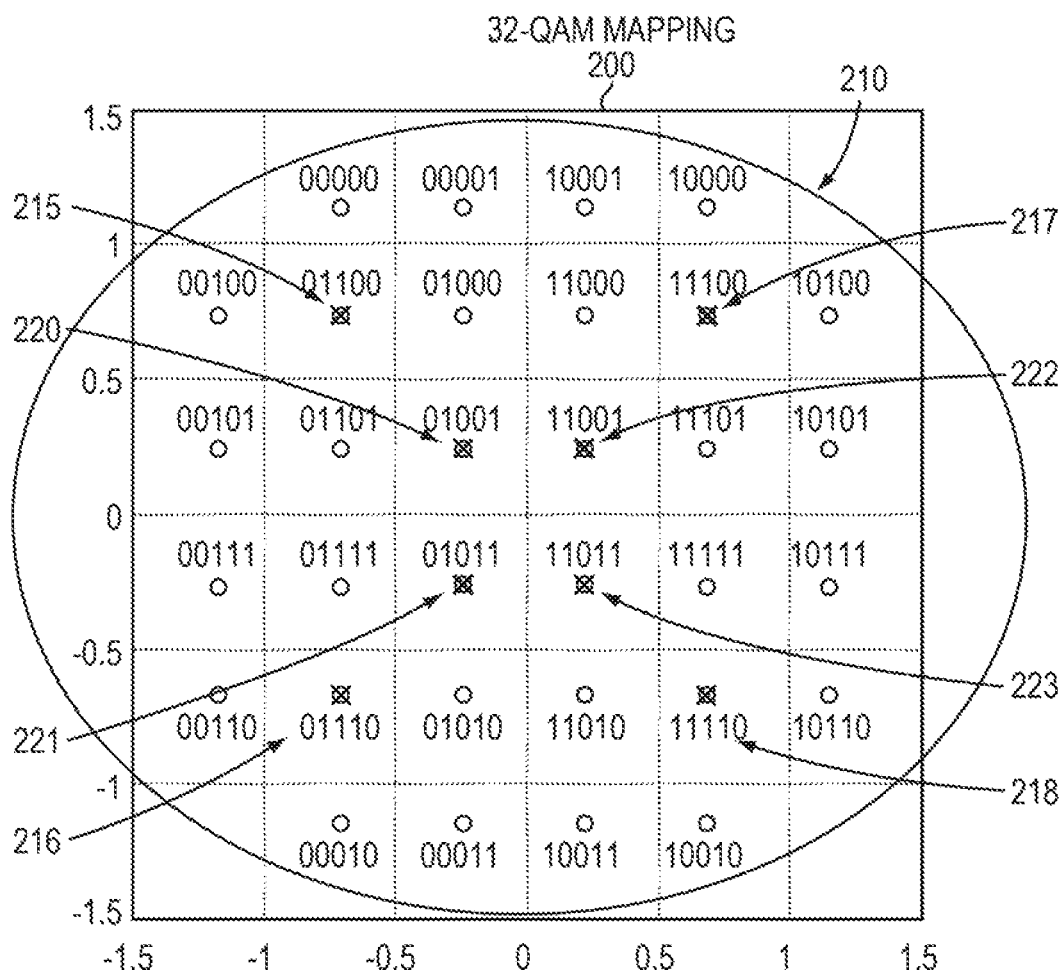
FIG. 2 is a simplified illustration of constellation points marking constellation points for use by Viterbi & Viterbi algorithm, in accordance with an embodiment of the present disclosure.

Refer now to the example embodiment of FIG. 2, which represents an alternative embodiment of the example of FIG. 1. In the example embodiment of FIG. 2, 32-QAM constellation has been marked by adding an X over the constellation points that may be used by a V-V algorithm for carrier phase estimation. For example in the example embodiment of FIG. 2, points 216, 216, 217, and 218 may be used by a V-V algorithm and points 220, 221, 222, and 223 may also be used by the V-V algorithm.

Figure 3:
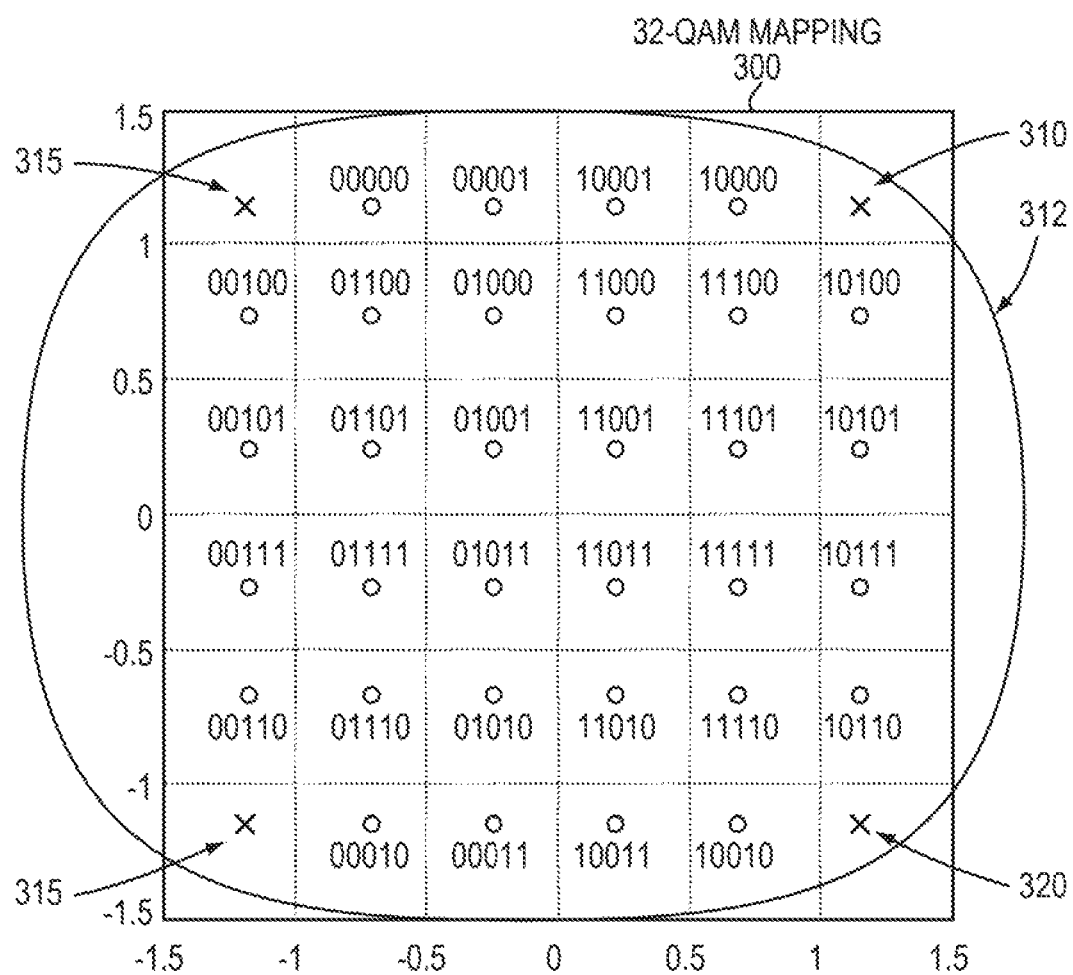
FIG. 3 is a simplified illustration of a 32-QAM modulation format without corner points, with the corner points marked by "X," in accordance with an embodiment of the present disclosure.

In some embodiments, the current disclosure appreciates that constellation points with higher power may contribute more to the carrier phase estimate. Refer now to the example embodiment of FIG. 3, which illustrates the lack of points in the corner of a typical 32 QAM constellation. In the example embodiment of FIG. 3, X 315, X 317, X 319 and X 321 mark the absence of outer constellation points beyond circle 312. In this example embodiment, these points, had they existed in constellation 300, would have been useful in calculating carrier phase as they would have been geometrically symmetric. In many embodiments, the current disclosure has realized that a weakness of the using a Viterbi & Viterbi algorithm to estimate carrier phase may be the lack of symmetric constellation points in certain constellations.

Figure 4:
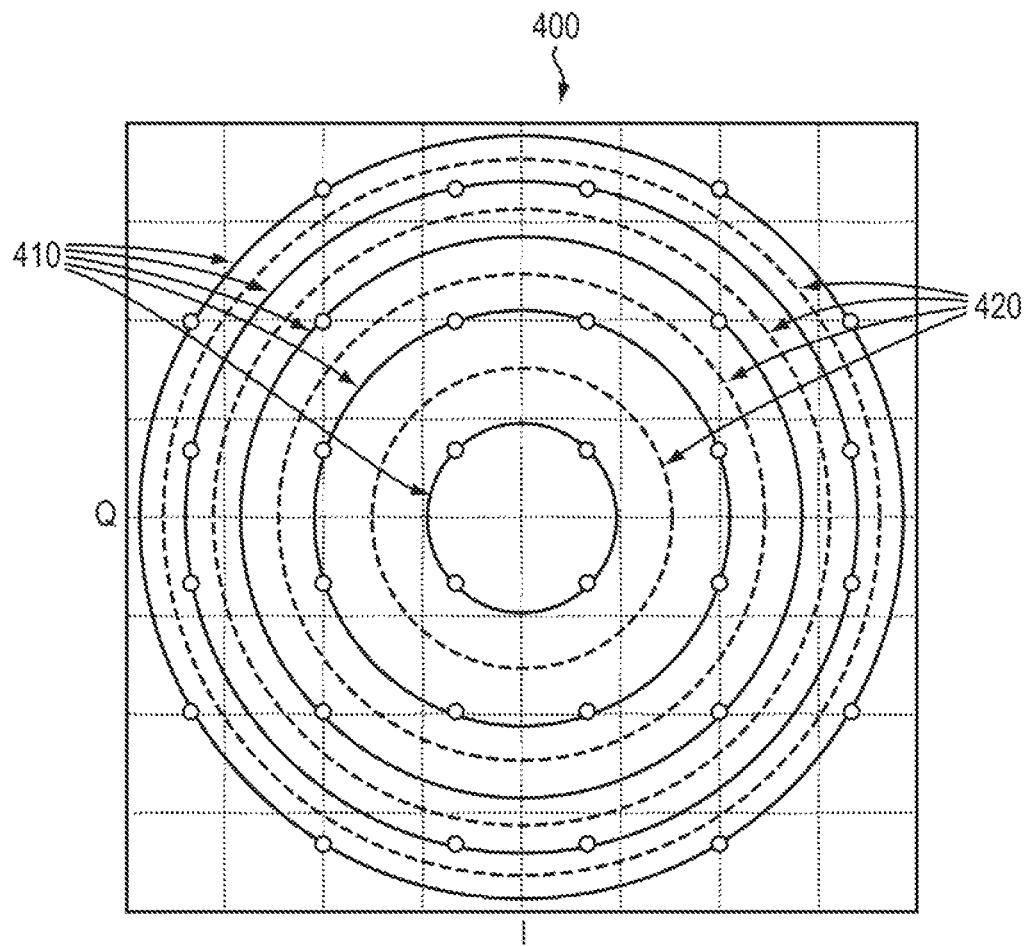
FIG. 4 is a simplified illustration of radial regions with dotted circles showing decision regions and reference radii with solid circles, in accordance with an embodiment of the present disclosure.

In certain embodiments, radially directed equalizers (RDE) may be used in communication systems with higher order modulation formats to compensate for various impairments such as inter symbol interference and polarization mode dispersion. In some embodiments, a RDE equalizer may define multiple radial regions. In many embodiments, if an amplitude of an observation falls in a region, equalizer error may be calculated based on the reference radii in that region. Refer now to the example embodiment of FIG. 4, which illustrates a radial graph. In the example embodiment of FIG. 4, radial regions are marked 420 and reference radii are marked 410. In the example embodiment of FIG. 4, the constellation points with higher power have more effect on the equalizer performance. In many embodiments, the current disclosure has realized that weaknesses of a 32-QAM may result from a lack of constellation points such as those missing in FIG. 3 as denoted by the "X"s. Examining the example embodiment of FIG. 4, those missing points are of higher power and would have contributed more to equalizer performance.

In most embodiments, the current disclosure has realized that it may be beneficial to use a constellation that has point in the corners so that RDE and V-V algorithms are more efficient. In many embodiments, to understand how to change constellation points, it may be helpful to understand how data is encoded into a constellation point.

Refer now to the example embodiment of FIG. 5a, which illustrates a schematic diagram of an optical system 500. In the illustrated embodiment, optical system 500 includes an optical transmitter 515, an optical receiver 525, and an optical communication link 520. In the illustrated embodiment, the optical transmitter 515 is configured to transmit data 510 received in an electrical format to optical receiver 525 over optical communication link 520 in an optical format.

Refer now as well to the example embodiment of FIG. 5b, which illustrates encoding and decoding of data. Optical transmitter 515 receives input signal of data 510 (step 550). Optical transmitter 515 map symbols 535 corresponding to the input signal 510 (step 555). Transmitter 515 transmits symbols 535 to optical receiver 525 over the optical communication link 520 (step 560). Receiver 525 receives symbols 535 over link 520 (step 565). Receiver 525 transmits symbols 535 to input signal 530 (step 570). Receiver 525 sends output signal 530 (step 575). In the illustrative embodiments of FIGS. 5a and 5b, the optical transmitter 515 is configured to map symbols 535 corresponding to the input signal 510.

In the illustrative embodiments of FIGS. 5 *a* and 5b, the optical system 500 is configured for long-haul transmission of the input signal 510 from the optical transmitter 515 to the optical receiver 525 over a distance of more than 2,000 km, more than 3,000 km, between 2,000 km and 8,000 km, or between 3,000 km and 6,000 km. In the illustrative embodiments of FIGS. 5a and 5b, optical communications link 520 is an optical waveguide (e.g., optical fiber).

In some embodiments, an optical receiver may provide output signal to a forward error correction (FEC) decoder. In certain embodiments, an optical transmitter may be an optical transceiver. In many embodiments, an optical receiver may be an optical transceiver.

Refer now to the example embodiment of FIG. 6a. FIG. 6a is a simplified example embodiment of an optical system with a link and two transceivers, each transceiver with an encoder, decoder, mapper modulator, decoder, demapper, and demodulator. In FIG. 6a, optical transceiver 615 has encoder 620, mapper 630 and modulator 635. As well, transceiver 615 has demapper 676, demodulator 678, and decoder 680. In the example embodiment of FIG. 6a, each functionality is shown as a separate box, however in alternative embodiments functionality may be combined or shared depending on design.

Referring back to the example embodiment of FIG. 6a, encoder 620 receives input signal 610 (step 680). Encoder 620 encodes input signal 610 to generate a plurality of bits 626 (step 682). Mapper 630 associates the plurality of bits 626 with symbols (step 684). Modulator 635 modulates light to send the plurality of signals across link 640 to transceiver 645 (step 686).

Transceiver 245 has demapper 650, demodulator 655, and decoder 660. Demapper 650 receives the symbols from optical link 640 (step 690). Demapper 250 associates the received symbols with a plurality of bits (step 692). Demodulator 655 provides the plurality of bits to decoder 660 (step 694). Decoder 660 decodes the bits (step 696). Decoder 660 transmits output 665 (step 698). Transceiver 645 also has encoder 670, mapper 672 and modulator 674. Encoder 670, mapper 672, and modulator 675 act in a similar manner to encoder 620, mapper 630, and modulator 635 at Transceiver 615. Similarly, decoder 680, demodulator 678 and demapper 276 of Transceiver 615 function similarly to demapper 650, demodulator 655 and decoder 660 of transceiver 645.

In the illustrative embodiment of FIG. 6a, modulator 635 is configured to transmit the plurality of symbols optical link 640 by modulating the plurality of symbols onto a carrier light wave, which subsequently propagates over optical communications link 640. In the illustrative embodiment of FIG. 6a, mapper 630 may be configured to associate the plurality of bits 610 with symbols 624 according a QAM.

In certain embodiments, an encoder such as encoder 620 of FIG. 6a, may generate a plurality of bits from an input signal using a turbo product code (TPC). In some embodiments, an encoder such as encoder 620 of FIG. 6a, may generate a plurality of bits from an input signal using a low-density parity check code (LDPC). In many embodiments, an encoder such as encoder 620 of FIG. 6a, may generate a plurality of bits from an input signal using a Reed Solomon code. In further embodiments, an encoder such as encoder 620 of FIG. 6a, may generate a plurality of bits from an input signal using any suitable forward error correction code. In many embodiments, a plurality of bits may include parity bits generated by an encoder. In certain embodiments, an encoder may be implemented in hardware as circuitry. In some embodiments, an encoder may be implemented as part of an application-specific integrated circuit (ASIC).

In some embodiments, QAM encoding may include a plurality of constellation points with each constellation point having a location in the complex plane indicating the in-phase (I) and quadrature (Q). In many embodiments, a constellation may include a bit label for each of the plurality of constellation points, with a bit label for a particular constellation point indicating which sequence of bits in the plurality of bits maps to the symbol represented by the particular constellation point. In most embodiments, bit labels for constellation points may specify a bit mapping for associating bits to symbols.

In some embodiments, a modulator, such as modulator 635 of FIG. 6a, may be configured to associate a plurality of bits to symbols using a constellation, by performing the association by using stored constellation information. In some embodiments, a modulator may include a memory storing constellation information indicating locations of points in a QAM constellation and bit labels for each of the points in a constellation. In some embodiments, constellation information may be stored in any suitable format, as aspects of the technology described herein are not limited in this respect. In some embodiments, memory may be part of an optical transmitter. In other embodiments, memory may be part of an optical transceiver. In certain embodiments, the memory may be part of a modulator. In some embodiments, a modulator may be implemented in hardware. In particular embodiments, a modulator may be implemented as or as part of an ASIC. In many embodiments, a decoder may be a forward error correction (FEC) decoder. In some embodiments, a transceiver may be a coherent optical transceiver.

In certain embodiments, a demodulator may include memory for storing constellation information indicating locations of points in a constellation and bit labels for each of the points in the constellation. In many embodiments, constellation information may be stored in any suitable format. In many embodiments, memory may be part of an optical receiver. In certain embodiments, memory may be part of a demodulator. In some embodiments, a demodulator may be implemented in hardware as circuitry. In certain embodiments, a demodulator may be implemented as an or part of an ASIC.

In most embodiments, a decoding process performed by a decoder may allow for accurate recovery of an input signal despite distortion induced to the transmitted signal over an optical communications link. In many embodiments, a decoder may implement a forward error correction decoding algorithm. In certain embodiments, a mapper may use a constellation that has points at the corners of a constellation. In many embodiments, a mapper may change a constellation to have points at the corners of the constellation if the constellation would have otherwise not have points at the corners of the constellation. In alternative embodiments, a mapper may apply different mapping or translation schemes to ensure that a constellation has points at the corners.

Figure 7:
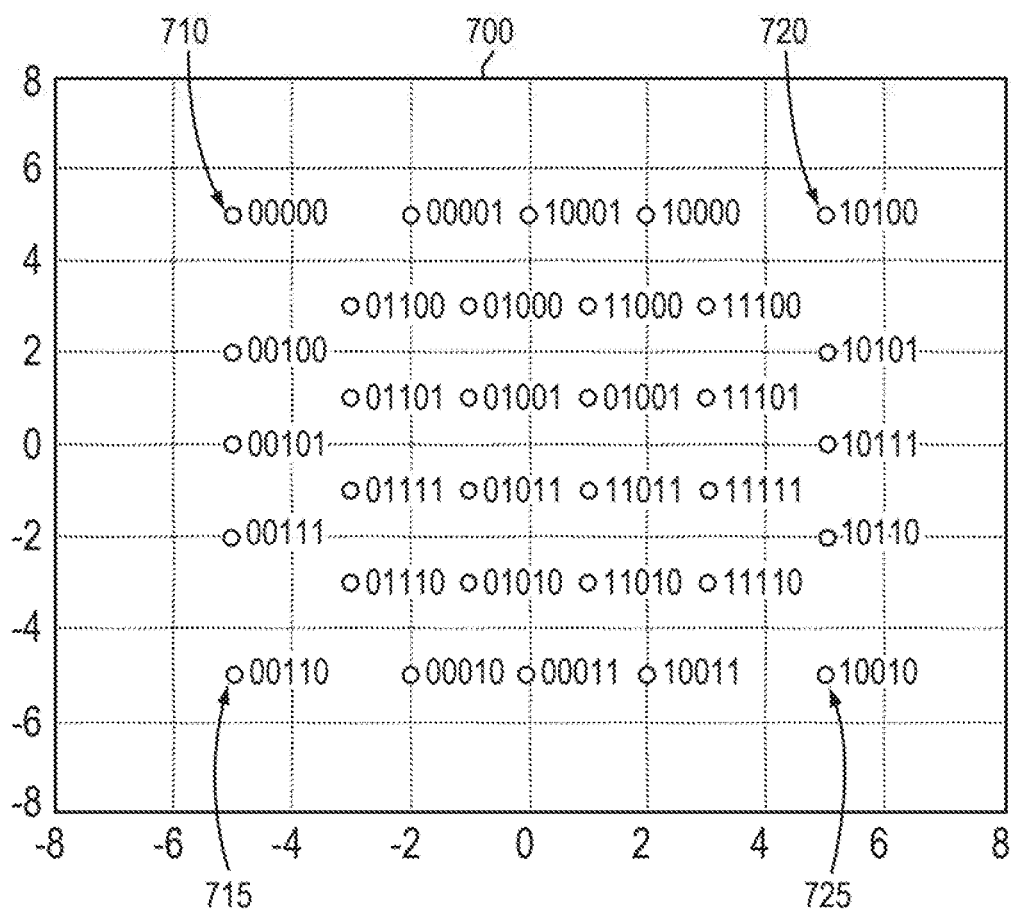
FIG. 7 is a simplified illustration of a geometrically shaped 32-QAM modulation format, in accordance with an embodiment of the present disclosure.

Refer now to the example embodiment of FIG. 7, which illustrates a 32-QAM constellation that is geometrically shaped. In the example embodiment of FIG. 7, 32 QAM constellation 700 has points 710, 715, 720, and 725, as point in the corners of constellation 700. The constellation of FIG. 7 may be contrasted with the constellation of FIG. 3, where there are no points in the corner.

In most embodiments, the current disclosure has realized that a geometrically shaped constellation with points at the corners may enable carrier recovery algorithms and equalizer to perform better. In many embodiments, outer constellations may be shifted so there are points on the outer corner of the constellation. In some embodiments, constellation points may be spaced to achieve symmetry in a constellation.

Figure 8:
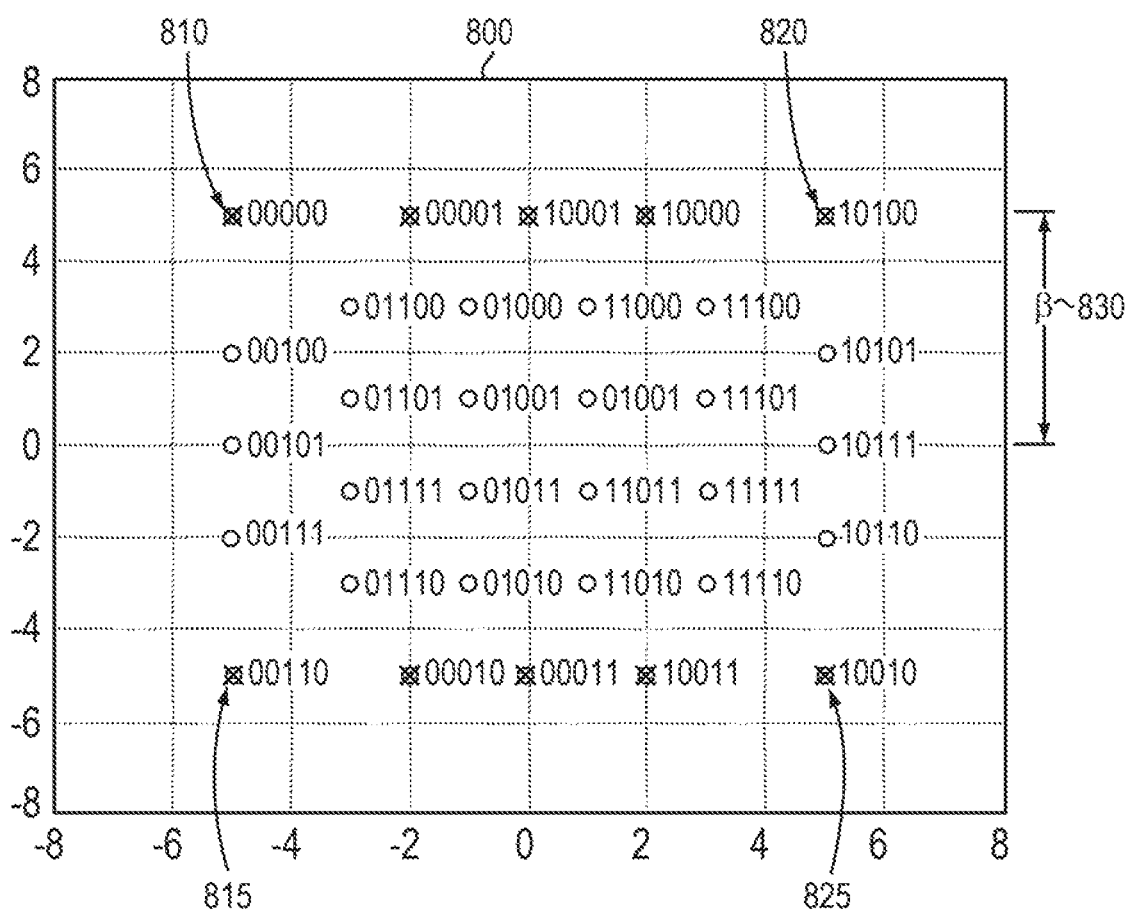
FIG. 8 is a simplified illustration of a geometrically shaped 32-QAM modulation format with constellation points that are not grey mapped marked with an "X," in accordance with an embodiment of the present disclosure.

Refer now to the example embodiment of FIG. 8, which illustrates an embodiment of a geometrically symmetrically constellation. In the example embodiment of FIG. 8, signal points have gray labeling except marked with "X" such as points 710, 715, 720, and 725. In the example embodiment of FIG. 8, constellation point are spaced so that they are not on the corner uniformly to achieve symmetry. In the example embodiment of FIG. 8, this enables non-gray labeled points to have same distance from their closest neighbors. In the example embodiment of FIG. 8, beta or distance between non-gray mapped symbols is optimized. In this embodiment, grey mapped symbols mean that the change between each bits assigned to the symbols does not change more than one bit. In most embodiments, it may be harder to determine an error between gray mapped symbols as only one bit is off between the two constellation points.

Figure 9:
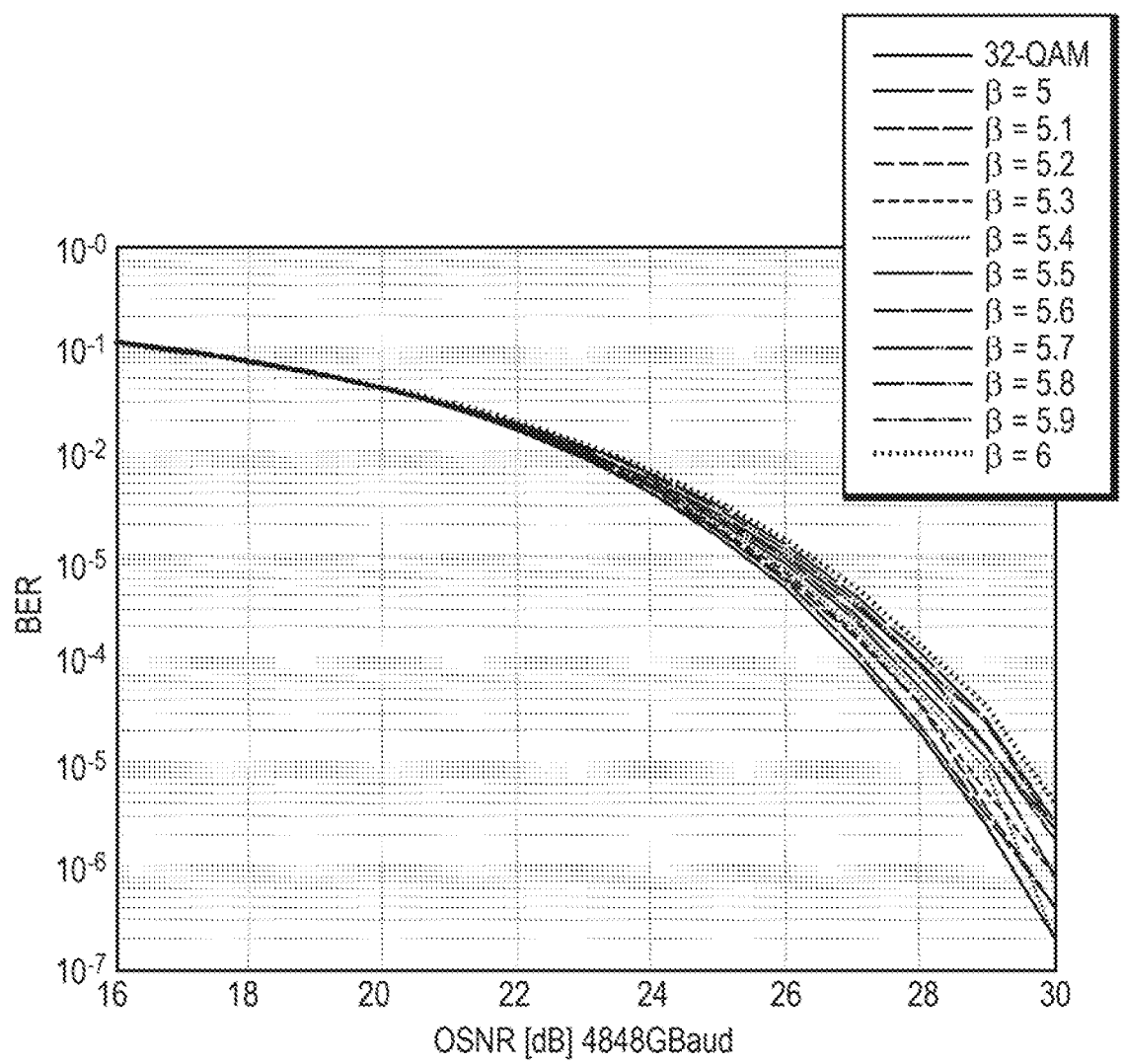
FIG. 9 is a simplified illustration of a performance comparison of conventional 32-QAM with geometrically shaped 32-QAM for a channel which adaptive white Gaussian noise (AWGN) has been added, in accordance with an embodiment of the present disclosure.

Refer now to the example embodiment of FIG. 9, which illustrates the impact of Beta on bit error rates for geometrically shaped 32 QAM as compared to traditional 32 QAM in a channel where adaptive white Gaussian noise has been added. In the example embodiment of FIG. 9, a beta of 5.2 is shown to have the best performance resulting in the lowest bit error rate. In this embodiment, geometrically shaped 32 QAM may cause a loss less than 0.1 dB, however it provides an advantage for phase and error correction.

Figure 10:
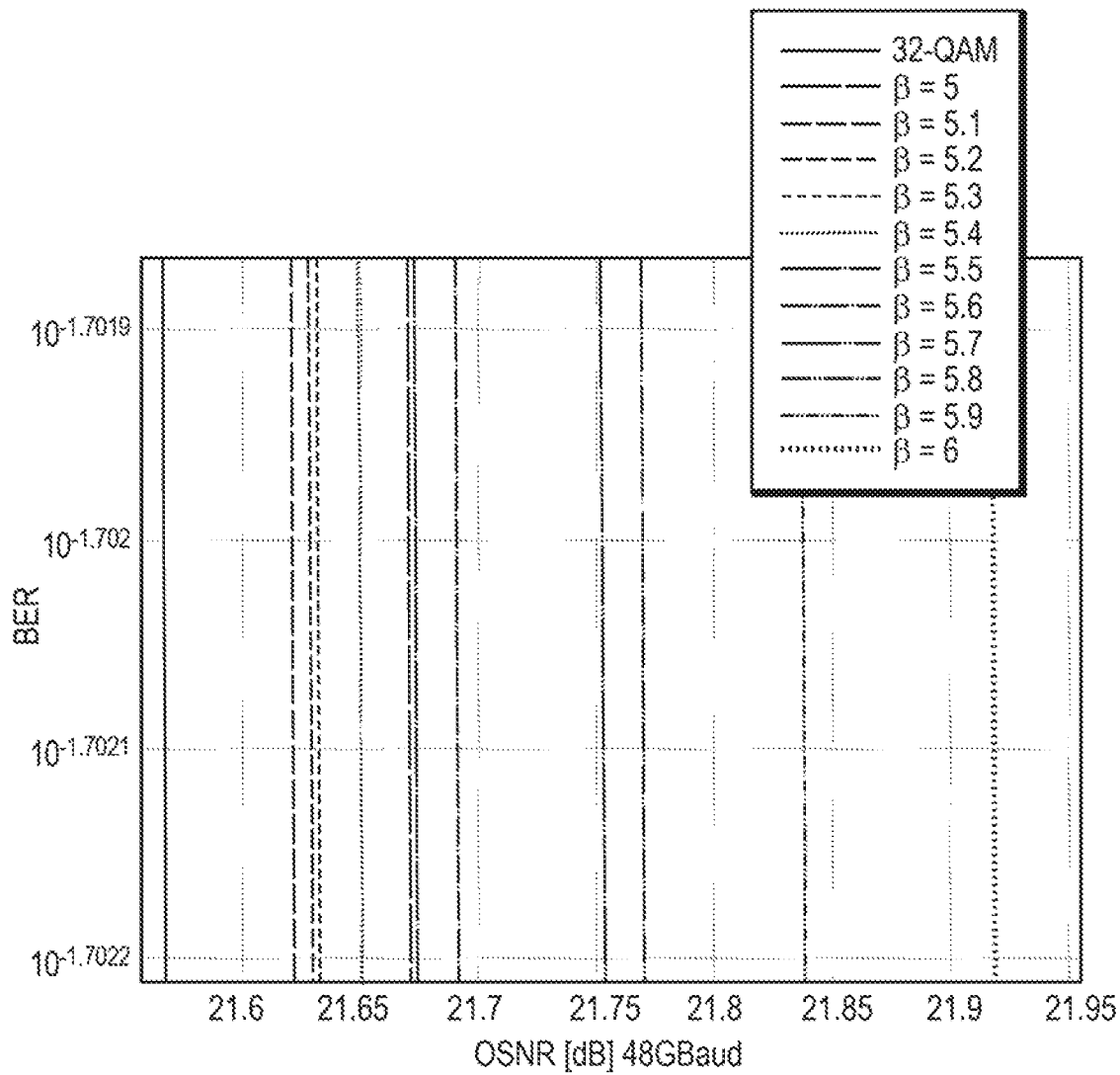
FIG. 10 is a simplified illustration of a performance comparison of conventional 32-QAM with geometrically shaped 32-QAM for an AWGN channel (zoomed to BER=2e-2), in accordance with an embodiment of the present disclosure.

Refer now to the example embodiment of FIG. 10, which represents a performance comparison of conventional 32 QAM with geometrically shaped 32 QM for a channel where AWGN has been added zoomed to a BER of 2e-2. In the embodiments of FIGS. 9 and 10, beta=5 provides symmetrical constellation points, which is desired for some error correction algorithms at the receiver.

Figure 11:
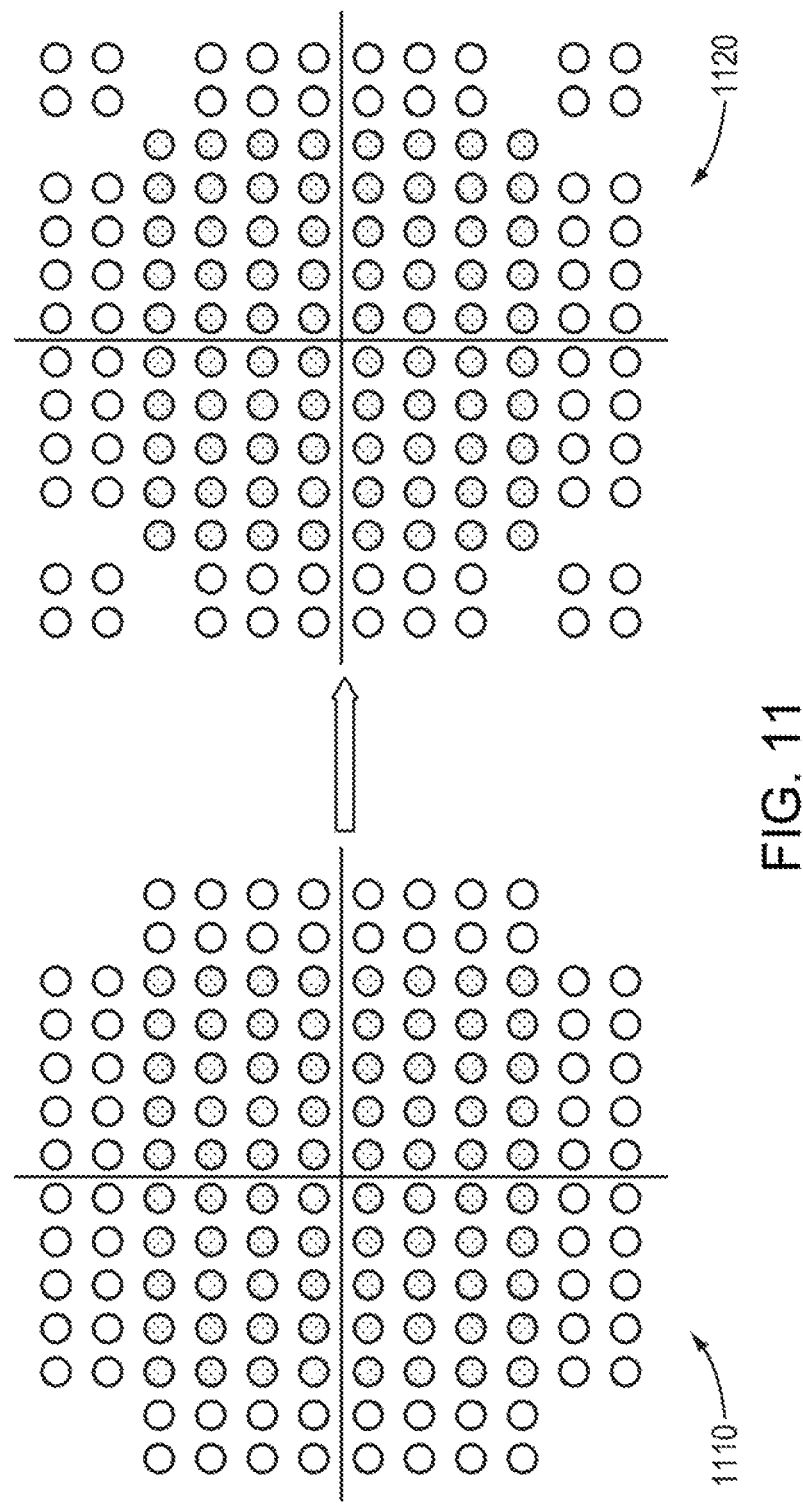
FIG. 11 is a simplified illustration of a how a constellation for 128-QAM modulation format without corners may be modified to a constellation for a 128 QAM modulation format with points in the corners, in accordance with an embodiment of the present disclosure.

Refer now to the example embodiment of FIG. 11, which illustrates how the techniques of the current disclosure may be applied to 128 QAM. Constellation 1110 shows a sample constellation at 128 QAM modulation. Constellation 1120 shows how the constellation may be modified to have constellation points at each corner. In most embodiments, the techniques disclosed herein may be used to transform any constellation that does not have constellation points at its corner to a constellation point that does have points at its corner.

In many embodiments, one or more of the current techniques may be performed in a Digital Signal Processing (DSP) of a receiver. In some embodiments, a DSP may encode a particular constellation. In most embodiments, one or more of the current techniques may be performed in real time.

In some embodiments, one or more of the embodiments described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor. In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programed into a DSP. In some embodiments, a DSP may have one or more processors and one or more memories. In certain embodiments, a DSP may have one or more computer readable storages. In some embodiments, on or more of an encoder, decoder, mapper, modulator, demodulator, decoder, and demapper may be part of one or more DSPs. In other embodiments, one or more of the embodiments stored on a computer readable medium may be loaded into a processor and executed. In further embodiments, on or more of the techniques herein may be performed by an ASIC chip. In certain embodiments, a DSP may be an ASIC chip.

What is claimed is:

1. A method for encoding a data for transmission across a communication link, the method comprising:
encoding the data into a constellation; wherein the constellation is of a power $2^n$; wherein n is an odd number; wherein encoding the constellation creates outer constellation points forming a square at an edge of the constellation; wherein a beta of the constellation is optimized to increase distance between at least some of the constellation points.

2. The method of claim 1 wherein the constellation corresponds to an 8 QAM encoding.

3. The method of claim 1 wherein the constellation corresponds to a 32 QAM encoding.

4. The method of claim 1 wherein the constellation corresponds to a 128 QAM encoding.

5. The method of claim 1 wherein the inner constellation points form a square QAM constellation of the order $2^{n-1}$.

6. The method of claim 5 wherein the inner constellation corresponds to a QPSK encoding.

7. The method of claim 5 wherein the inner constellation corresponds to a 16 QAM encoding.

8. A digital signal processor including logic for encoding a data for transmission across a communication link, the logic enabling:
encoding the data into a constellation; wherein the constellation is of a power $2^n$; wherein n is an odd number; wherein encoding the constellation creates outer constellation points forming a square at an edge of the constellation; wherein a beta of the constellation is optimized to increase distance between at least some of the constellation points.

9. The digital signal processor of claim 8 wherein the constellation corresponds to an 8 QAM encoding.

10. The digital signal processor of claim 8 wherein the constellation corresponds to a 32 QAM encoding.

11. The digital signal processor of claim 8 wherein the constellation corresponds to a 128 QAM encoding.

12. The digital signal processor of claim 8 wherein the inner constellation points form a square QAM constellation of the order $2^{n-1}$.

13. The apparatus of claim 12 wherein the inner constellation corresponds to a QPSK encoding.

14. The apparatus of claim 12 wherein the inner constellation corresponds to a 16 QAM encoding.

15. A system for encoding a data for transmission across a communication link, the system comprising:
a processor; and
logic configured to be run on the processor; the logic enabling:
encoding the data into a constellation; wherein the constellation is of a power $2^n$; wherein n is an odd number; wherein encoding the constellation creates outer constellation points forming a square at an edge of the constellation; wherein a beta of the constellation is optimized to increase distance between at least some of the constellation points.

16. The system of claim 15 wherein the constellation corresponds to an 8 QAM encoding.

17. The system of claim 15 wherein the constellation corresponds to a 32 QAM encoding.

18. The system of claim 15 wherein the constellation corresponds to a 128 QAM encoding.

19. The system of claim 15 wherein the inner constellation points form a square QAM constellation of the order $2^{n-1}$.

20. The system of claim 19 wherein the inner constellation corresponds to a 16 QAM encoding.

* * * * *